United States Patent
Nonaka et al.

[11] Patent Number: 6,163,358
[45] Date of Patent: Dec. 19, 2000

[54] ACTIVE MATRIX LCD WITH INSULATING FILM HAVING APERTURES FOR LIMITING MOVEMENT OF SPACERS

[75] Inventors: Masanobu Nonaka; Hisaaki Hayashi, both of Hyogo-ken; Koichi Shiba, Himeji; Tomiaki Yamamoto; Osamu Hoshino, both of Hyogo-ken, all of Japan

[73] Assignee: Kabushiki Kaisha Toshiba, Kawasaki, Japan

[21] Appl. No.: 09/165,155

[22] Filed: Oct. 2, 1998

[30] Foreign Application Priority Data

Oct. 6, 1997 [JP] Japan ..................... 9-272282
May 8, 1998 [JP] Japan ..................... 10-125466

[51] Int. Cl.⁷ ................ G02F 1/1333; G02F 1/1339
[52] U.S. Cl. .......................... 349/155; 349/138
[58] Field of Search .................. 349/139, 155, 349/42, 122

[56] References Cited

U.S. PATENT DOCUMENTS 5,181,132  1/1993  Shindo et al. ............. 349/155
5,982,471  11/1999  Hirakata et al. ........... 349/155

FOREIGN PATENT DOCUMENTS 6-175115  6/1994  Japan .

*Primary Examiner*—William L. Sikes
*Assistant Examiner*—Toan Ton
*Attorney, Agent, or Firm*—Oblon, Spivak, McClelland, Maier & Neustadt, P.C.

[57] ABSTRACT

A liquid crystal layer is sealed between an array substrate and an opposed substrate arranged to oppose each other with a gap. A multiplicity of particulate spacers are arranged between the array and opposed substrates to maintain the gap therebetween. The array substrate is formed with a transparent insulating film covering signal lines, scanning lines, switching elements and pixel electrodes. The areas of the insulating film opposing the respective pixel electrodes are each formed with a plurality of apertures for limiting the movement of the spacers.

12 Claims, 4 Drawing Sheets

ACTIVE MATRIX LCD WITH INSULATING FILM HAVING APERTURES FOR LIMITING MOVEMENT OF SPACERS

BACKGROUND OF THE INVENTION

The present invention relates to a liquid crystal display device in which the gap between opposed substrates is held by use of particulate spacers.

A liquid crystal display device of active matrix type, for example, is configured of an array substrate, an opposed substrate arranged in opposed relation to the array substrate, and a liquid crystal layer held between the substrates, in which the two substrates are attached to each other by a sealing member arranged along the peripheral edge thereof. A multiplicity of particulate spacers are arranged between the two substrates for maintaining a predetermined gap between the substrates.

Generally, the array substrate includes a transparent insulating substrate of glass or the like material, a plurality of signal lines and a plurality of scanning lines arranged in matrix on the insulating substrate, and switching elements disposed at the intersections of the signal and scanning lines. A pixel electrode is arranged in an area defined by each signal line and each scanning line, and connected to a signal line and a scanning line through the switching element. Further, an insulation protective film formed of such a material as SiN is provided on the insulating substrate and covers the signal lines, the scanning lines and the switching elements except for the pixel electrodes. An orientation film for orienting the liquid crystal molecules is arranged on the protective film and the pixel electrodes.

The opposed substrate, on the other hand, has a transparent insulating substrate of glass or the like formed with a black matrix pattern of such a shielding material as Cr, on which red, green and blue colored layers are formed as a color filter. An opposed electrode is formed on the color filter.

The array substrate and the opposed substrate are attached to each other in opposed relation, and a liquid crystal material is sealed in the gap between the substrates thereby to constitute a liquid crystal display device. Also, in order to maintain a cell gap, i.e., the gap between the array substrate and the opposed substrate, in a predetermined value, a multiplicity of transparent particulate spacers are dispersed between the substrates.

In the liquid crystal display device configured as described above, the spacers are particulate. When the apparatus is subjected to a vibration or a shock, therefore, the spacers may be moved in the gap between the two substrates with the result that the orientation film is liable to be damaged and cause a display failure.

BRIEF SUMMARY OF THE INVENTION

The present invention has been developed in view of the above-mentioned situation, and its object is to provide a liquid crystal display device with high reliability in which a display failure due to the particulate spacers can be prevented.

In order to achieve the above-mentioned object, according to one aspect of the present invention, there is provided a liquid crystal display device comprising an array substrate including an insulating substrate, a plurality of wirings arranged in matrix on the insulating substrate and a plurality of pixel electrodes connected to the wirings through switching elements each arranged in an area defined by the wirings; an opposed substrate opposing the array substrate with a gap; a liquid crystal layer held in the gap between the array substrate and the opposed substrate; a plurality of particulate spacers arranged between the array substrate and the opposed substrate and holding a predetermined gap between the substrates; an orientation film arranged in contact with the liquid crystal layer on at least one of the array substrate and the opposed substrate; and a film formed on one of the array substrate and the opposed substrate to oppose the pixel electrodes, the film having a plurality of areas each of which is opposed to the pixel electrode and includes a plurality of apertures for limiting the movement of the spacers.

With the above-mentioned liquid crystal display device, an uneven surface is formed on each pixel electrode by arranging a film patterned with a plurality of apertures in each area opposing the pixel electrode. The movement of the particulate spacers in the pixel electrode area, that is, the display area, can be limited by the uneven surface. Specifically, the spacer located in a recess defined by the film aperture is movable only in the particular recess and the movement thereof beyond the recess is restricted. Therefore, the damage to the orientation film which otherwise might be caused by the movement of the spacers, and hence a display failure can be prevented.

In this liquid crystal display device, each aperture has a polygonal shape. As compared with a circular aperture, the polygonal aperture can reduce the area on which the film is formed. Therefore, it is possible to reduce the voltage drop across the liquid crystal layer when the electrons are charged on the film patterned with a plurality of apertures.

The width of the aperture cut by an arbitrary straight line is set to less than 40 $\mu$m. As a result, the movable range of the spacers distributed in the aperture areas is limited to less than 40 $\mu$m, so that a display failure is prevented which otherwise might be caused by the orientation film being damaged as the spacers move.

Further, a plurality of apertures corresponding to each pixel electrode are arranged to define a shape substantially similar to the pixel electrode. Thus, the area on which the film is formed can be reduced, and so can be reduced the voltage drop due to the film having a plurality of apertures.

According to another aspect of the invention, there is provided a liquid crystal display device comprising an array substrate including an insulating substrate, a plurality of wirings arranged in matrix on the insulating substrate, and a plurality of pixel electrodes connected to the wirings through switching elements each arranged in an area defined by the wirings; an opposed substrate opposing the array substrate with a gap; a liquid crystal layer held in the gap between the array substrate and the opposed substrate; a plurality of particulate spacers disposed between the array substrate and the opposed substrate for holding the gap between the substrates at a predetermined value; an orientation film arranged in contact with the liquid crystal layer on at least one of the array substrate and the opposed substrate; and a film formed on one of the array substrate and the opposed substrate and having a plurality of areas in opposed relation to the respective pixel electrodes, each of the areas being patterned to have a plurality of islands for limiting the movement of the spacers.

Also in the liquid crystal display device configured this way, the film including a plurality of areas each of which opposes a pixel electrode and has a pattern of islands is arranged, and therefore an uneven surface is formed on each pixel electrode. As a result, the movement of the particulate spacers in the pixel electrode area, that is, the display area is limited by the uneven surface, thereby preventing the orientation failure which otherwise might be caused by the damage to the orientation film. The distance between the islands of the pattern corresponds to the width of the aperture of the above-mentioned crystal liquid apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 1 to 3 show a liquid crystal display device according to a first embodiment of the invention, in which:

FIG. 1 is a perspective view of the liquid crystal display device;

FIG. 2 is a plan view showing an array substrate of the liquid crystal display device;

FIG. 3 is a sectional view taken in line III—III in FIG. 2;

DETAILED DESCRIPTION OF THE INVENTION

With reference to the accompanying drawings, a liquid crystal display device of active matrix type according to this invention will be described in detail.

Figure 1:
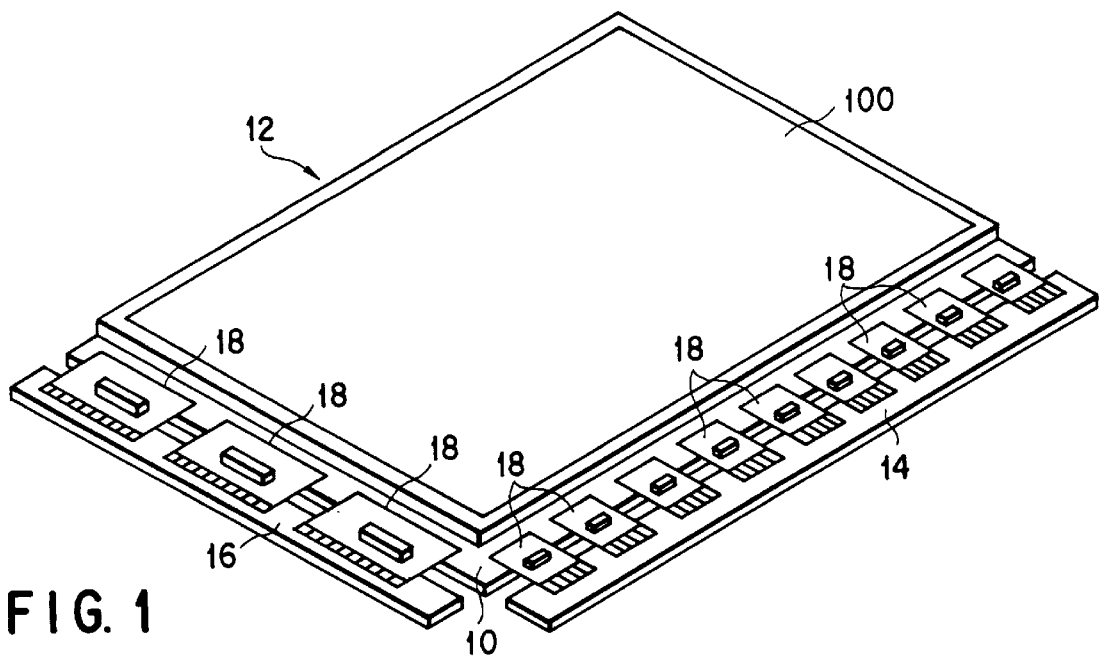

As shown in FIG. 1, a liquid crystal display device of active matrix type comprises a liquid crystal display panel 12, a signal line drive circuit substrate 14 and a scanning line drive circuit substrate 16 for driving the liquid crystal display panel, and a plurality of tape carrier packages (TCP) 18 electrically connecting each the drive circuit substrates to the liquid crystal display panel.

Figure 2:
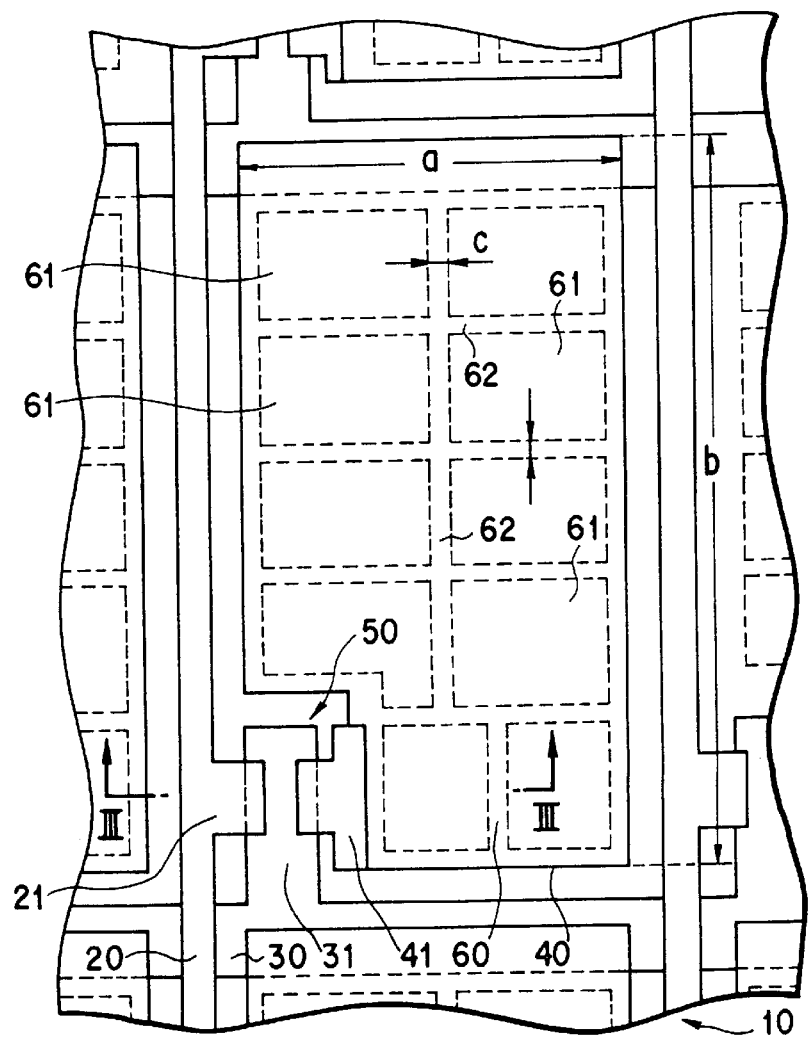
Figure 3:
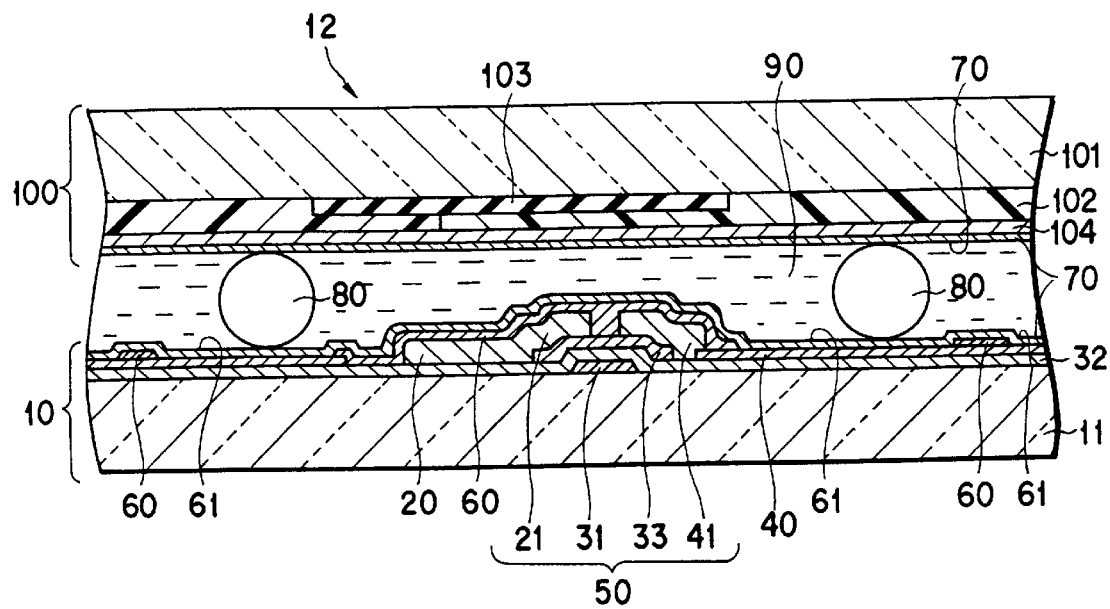

As shown in FIGS. 1 to 3, the liquid crystal display panel 12 includes an array substrate 10 and an opposed substrate 100. These substrates are arranged to oppose each other with a predetermined gap, that is, a cell gap therebetween by attaching the peripheral edge portions thereof to each other with a sealing agent not shown. In the gap between the array substrate 10 and the opposed substrate 100 is sealed a liquid crystal layer 90 serving as an optical modulation layer. At the same time, a multiplicity of particulate spacers 80 about 5 μm in diameter are dispersed for maintaining a predetermined value of the cell gap between the two substrates.

The cell gap between the array substrate 10 and the opposed substrate 100 is assumed to be 5 μm in size, and a liquid crystal having a chiral pitch of 60 μm is used. Also, the array substrate 10 and the opposed substrate 100 each have an orientation film 70 in contact with the liquid crystal layer 90. These orientation films 70 are processed for orientation substantially at right angles to each other, so that the liquid crystal molecules are arranged about 90 degree twisted.

As shown in FIGS. 2 and 3, the array substrate 10 includes a glass substrate 11 as a transparent insulating substrate, on which a multiplicity of parallel signal lines 20 and a multiplicity of parallel scanning lines 30 are formed in matrix substantially at right angles to one another. The areas defined by the signal lines 20 and the scanning lines 30 are each formed with a pixel electrode 40. Each pixel electrode 40 is connected to the intersection of the signal line and the scanning line through a thin-film transistor (hereinafter it calls as TFT) 50 serving as a switching element.

Each TFT 50 includes a gate electrode 31 in the same layer as the scanning lines 30, a gate insulating film 32 arranged to cover the gate electrode, a semiconductor layer 33 formed on the gate electrode through the gate insulating film, and a drain electrode 21 and a source electrode 41 which are connected to the semiconductor layer 33 formed in the same layer as the signal line 20. The pixel electrode 40 is connected to the TFT 50 through the source electrode 41.

On the other hand, the array substrate 10 includes a transparent insulating film 60 of silicon nitride about 2000 Å thick, which is formed to cover the signal lines 20, scanning lines 30, TFTs 50 and pixel electrodes 40, and the orientation film 70 about 700 Å thick is formed over the insulating film 60.

The pattern of the insulating film 60 will be explained in detail. The area of the insulating film 60 opposing each pixel electrode 40 is formed with a plurality of apertures 61. The aperture 61 is formed in polygonal shape, say, rectangular shape. The area opposing each pixel electrode 40 has ten apertures 61, for example. According to this embodiment, the size a μm×b μm of the pixel electrode 40 is assumed to be 70 μm×200 μm, the size of the aperture 61 to be 20 μm×20 μm, and the width c of the bridge 62 located between adjacent apertures 61 to be 5 μm.

In FIG. 2, in order to avoid complicating the drawing, only the apertures 61 of the insulating film 60 are illustrated in dashed line, and the other portions of the insulating film 60 are not shown.

Also, according to this embodiment, each pixel electrode 40 has a hexagonal shape with a corner of the rectangle interfering with the TFT 50 cut off. Ten apertures 61 are formed for each pixel electrode 40 and arranged so as to define, as a whole, a form similar to the outer periphery of the effective display area of the pixel electrode.

As shown in FIG. 3, on the other hand, the opposed substrate 100 includes a glass substrate 101 as a transparent insulating substrate, on which a light shielding layer 103 of Cr patterned in a grid, and a color filter layer 102 including a red (R), green (G) and blue (B) colored layers arranged in such a position as to fill the gap between the light shielding layers. Further, the opposed electrode 104 and the orientation film 70 are arranged in layers in that order to cover the colored layers. The light shielding layer 103 is positioned in opposed relation to the signal lines 20, the scanning lines 30 and the TFTs 50 on the array substrate 10.

In the liquid crystal display device configured as mentioned above, the insulating film 60 is patterned with a plurality of the apertures 61 and the orientation film 70 is formed thereon, so that the orientation film 70 has an uneven surface, and a plurality of recesses are formed by the apertures 61 and a plurality of protrusions by the insulating film 60 on the pixel electrode 40. These recesses and protrusions can limit the movement of the particulate spacers 80 arranged in the area opposing the pixel electrode 40.

Specifically, a plurality of the spacers 80 dispersed on the pixel electrode 40 are located in the recesses, respectively, defined by the apertures 61 of the insulating film 60. As a result, in spite of the tendency of the spacers 80 to move under the vibration or shock exerted on the liquid crystal display panel 12, the movement of each spacer is limited within the corresponding recess, thus making it possible to reduce the damage to the orientation film 70. In this way, it is possible to provide a reliable liquid crystal display device in which a display failure is prevented.

The degree of unevenness in terms of the difference between recess and protrusion is required to be not less than 1000 Å, or more preferably, not less than 1500 Å with the liquid crystal display panel 12 formed, that is, with the orientation film 70 formed covering the insulating film 60 patterned to have the apertures 61. Also, in order to narrow the range in which an orientation failure occurs due to the rubbing of the orientation film 70, the recess-protrusion difference is desirably set to not more than about 2500 Å.

Figures 4A, 4B:
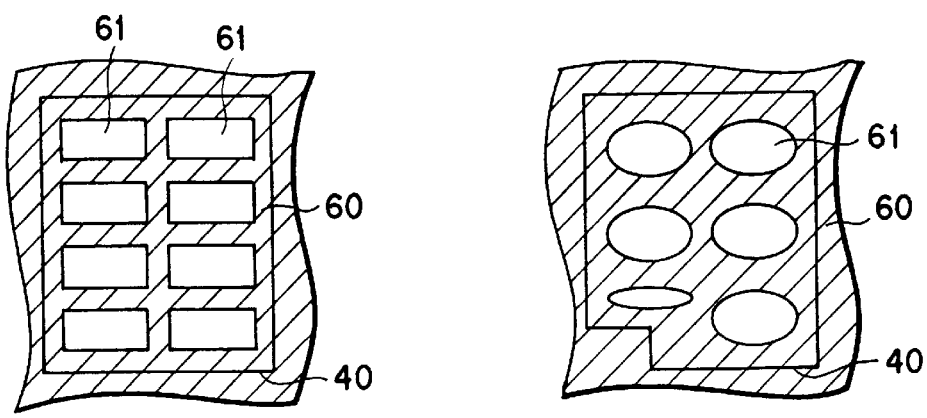
FIG. 4A is a plan view showing a shape of the aperture of the insulating film formed on the array substrate.
FIG. 4B is a plan view showing another shape of the apertures of the insulating film formed on the array substrate.

Also, in the above-mentioned liquid crystal display device, ten apertures 61 are provided for each pixel electrode 40. These ten apertures 61 as a whole are shaped in a form similar to the outer periphery of the effective display area of the pixel electrode 40. The area in which the insulating film 60 is formed on the pixel electrode 40 thus can be reduced and the voltage drop can be prevented. In the case where the pixel electrode has a rectangular shape as shown in FIG. 4A, for example, a plurality of the apertures as a whole is formed substantially similar to the pixel electrode, thereby producing the above-mentioned effect.

The present invention is not limited to the above-mentioned embodiment but can be modified in various forms without departing from the scope of the invention. The apertures 61 formed in the insulating film 60, for example, are not limited to a polygon but a similar effect is obtained by the circle as shown in FIG. 4B. At least to the extent that there are a plurality of apertures 61 formed in the insulating film for each pixel electrode 40, a higher effect is obtained than the conventional pixel electrodes on which no insulating film is formed.

Also, according to this embodiment, the film having a plurality of apertures 61 opposing the pixel electrode is configured in the same layer as the insulating film covering the signal lines, the scanning lines and the TFTs. Nevertheless, a different film can be used for the same purpose.

Further, the size of the aperture 61 is required to have a width of less than 40 μm as measured along an arbitrary line in which the aperture is cut away, whereby the movable range of the spacers 80 can be controlled accordingly. In the case where the aperture 61 is a square of 20 μm×20 μm, for example, the length of the diagonal line of the square constitutes the longest distance along which the spacers 80 are movable. The minimum size of the aperture 61, on the other hand, is determined at a desirable value taking into consideration an accuracy of patterning of the insulting film 60, and the ratio of the area in which formed with the film 60 having the apertures to the area in which the film 60 having the apertures is formed to the area in which the pixel electrodes are formed and the like. Also, the distance between adjacent apertures 61, that is, the width c of the bridge 62 can be set to a desired value taking into consideration an accuracy of patterning of the film 60, and the ratio of the area in which the film 60 having the apertures is formed to the area in which the pixel electrodes are formed and the like.

According to the above-mentioned embodiment, the insulating film 60 patterned to have a plurality of the apertures 61 opposing the pixel electrode 40 is formed on the array substrate 10. In spite of this, a similar effect can be produced by forming the insulating film 60 on the opposed substrate 100.

Figure 5:
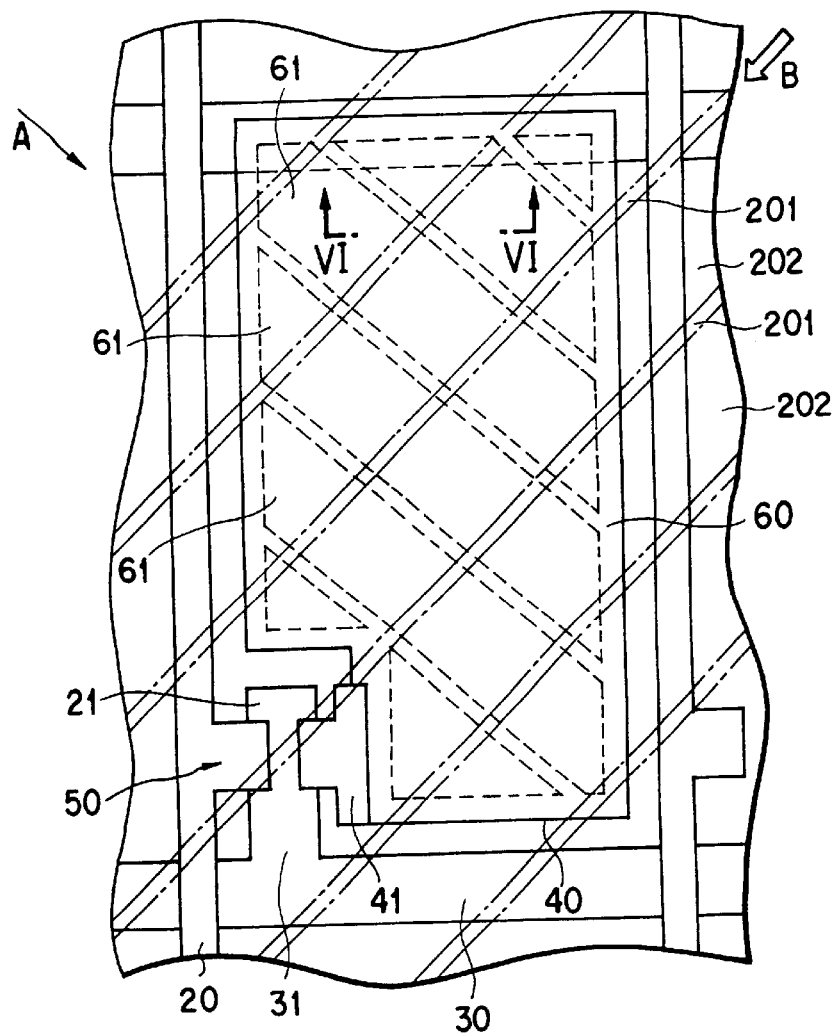
FIG. 5 is a plan view showing a part of the array substrate of the liquid crystal display device according to a second embodiment of the invention.
Figure 6:
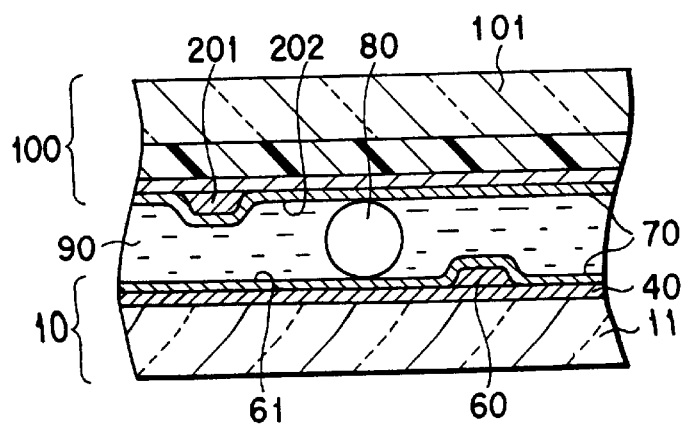
FIG. 6 is a sectional view taken in line VI—VI of FIG. 5.

Further, as in a second embodiment of the invention shown in FIGS. 5 and 6, an insulating film having apertures can be formed on both the array substrate and the opposed substrate. According to the second embodiment, the insulating films formed on the array substrate 10 and the opposed substrate 100 are patterned in stripes in such a manner that the patterns of the two insulating films extend in the directions at right angles to each other.

More specifically, as shown in FIGS. 5 and 6, a glass substrate 11 of the array substrate 10 is formed with the insulating film 60 and an orientation films 70 in this order so as to cover the signal lines 20, the scanning lines 30, the TFTs 50 and the pixel electrodes 40. The area of the insulating film 60 which is opposed to each pixel electrode 40 is patterned in such a manner as to form a plurality of parallel-extending striped apertures 61. These apertures 61 extend substantially in parallel to the direction A in which the orientation film 70 on the array substrate 10 is processed for orientation.

In FIG. 5, to avoid the complication of the drawing, only the apertures 61 of the insulating film 60 are shown by dashed line and the other portion of the insulating film is omitted.

On a glass substrate 101 of the opposed substrate 100 are formed, over the entire surface thereof in the order mentioned below, a color filter 102 including R (red), G (green) and B (blue) colored layers, an opposed electrode 104, an insulating film 201 patterned to have a multiplicity of parallel striped apertures and an orientation film 70. The insulating film 201 is patterned in such a manner as to have the striped apertures 202 thereof extending substantially parallel to the direction B in which the orientation film 70 on the opposed substrate 100 is processed for orientation and in the direction at right angle to the extension of the apertures 61 formed in the insulating film 60 on the array substrate 10.

The array substrate 10 and the opposed substrate 100 are arranged to oppose each other with the peripheral edges thereof being attached to each other. A liquid crystal layer 90 is sealed and the particulate spacers 80 are arranged in the gap between the substrates. Each spacer 80 is held with the movement thereof being limited by the uneven surfaces caused by the apertures 60, 202 formed in the insulating films 60 and 201 on the array substrate 10 and the opposed substrate 100.

As described above, even in the case where a patterned film is formed on both the two substrates, the same effects as in the above-mentioned embodiment can be obtained. Also, the apertures formed in each insulating film extend substantially in parallel to the direction in which the orientation film on the corresponding substrate is processed for orientation. It is therefore possible to prevent the occurrence of an orientation failure which otherwise might be caused by insufficient contact of the rubbing hair with the orientation film. A liquid crystal display device having a superior quality can thus be produced.

Figure 7:
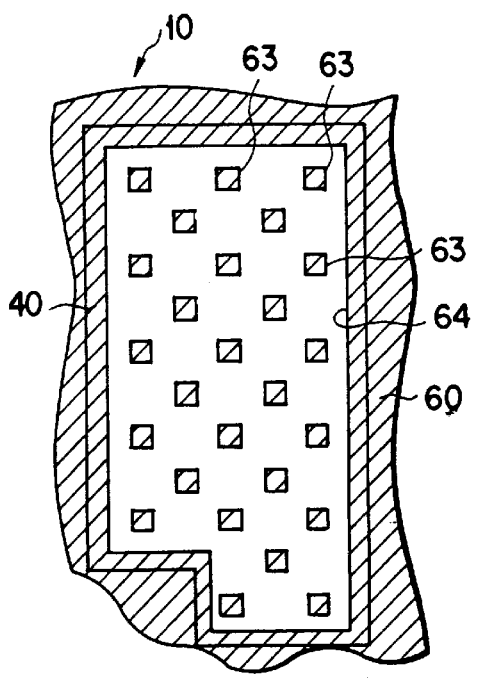
FIG. 7 is a plan view showing an array substrate including an insulating film having an island pattern in an area opposing the pixel electrode.

Also, according to the above-mentioned embodiments, the insulating film 60 or 201 has areas each of which opposes the pixel electrode and includes a plurality of apertures. As shown in FIG. 7, however, the insulating film 60 may alternatively be patterned in such a manner as to have an aperture 64 opposed to the effective area of the pixel electrode 40 and a plurality of rectangular islands 63 in spaced relation to one another in the aperture 64. In this case, the interval between adjacent islands 63 corresponds to the width of the aperture 61 in the above-mentioned embodiment.

Even in the case where this insulating film 60 is used, as in the above-mentioned embodiments, the excessive movement of particulate spacers can be restricted by the unevenness formed by the island pattern 63 thereby to prevent the orientation film from being damaged.

Figure 8:
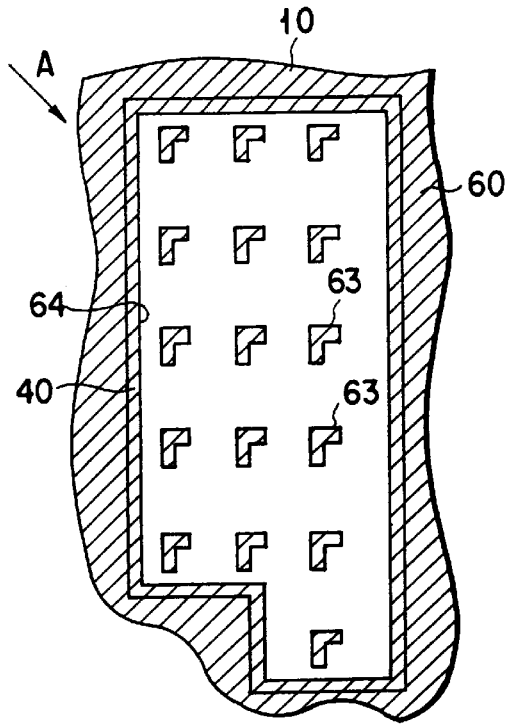
FIG. 8 is a plan view schematically showing a modification of the island pattern.

The shape of the island pattern 63 is not limited to a rectangle but can be an arbitrary shape or L-shaped, for example, as shown in FIG. 8. In such a case, each island 63 is arranged so that the L-shaped corner portion thereof is located on the upstream side with respect to the direction A in which the array substrate 10 is processed for orientation. Then, the orientation failure is reduced and a liquid crystal display device of superior quality can be produced.

In a liquid crystal display device with a film which is formed on the opposed substrate or the array substrate in opposed relation to the pixel electrodes and has a plurality of apertures or an island pattern, as in the above-mentioned embodiments, on the other hand, the apertures or the island pattern formed on the film generates an unevenness on the orientation film. As a result, in orienting the orientation film by rubbing, the unevenness causes some portions of the orientation film exposed to the rubbing hair and other places not exposed.

Specifically, in a liquid crystal display device having an insulating film 60 formed with a plurality of apertures 61 as shown in FIG. 2, portions not exposed to the rubbing hair, that is, portions not processed for orientation are liable to occur in the neighborhood of the bridges 62 of the insulating film 60. The liquid crystal molecules in the areas not oriented and the liquid crystal molecules in the areas oriented sometimes develop a twist reverse in which the liquid crystal is twisted in opposite directions. This generates a bright spot in the screen often deteriorating the image quality.

For this bright spot to be prevented, the ratio of liquid crystal chiral pitch to the cell gap or the thickness of the liquid crystal layer is desirably maintained in a range of 10 to 14. With the liquid crystal display device according to the above-mentioned embodiments, the chiral pitch of the liquid crystal is set to 60 μm, the cell gap to 5 μm, so that the ratio between the chiral pitch of the liquid crystal and the cell gap is maintained at 12.

Figure 9:
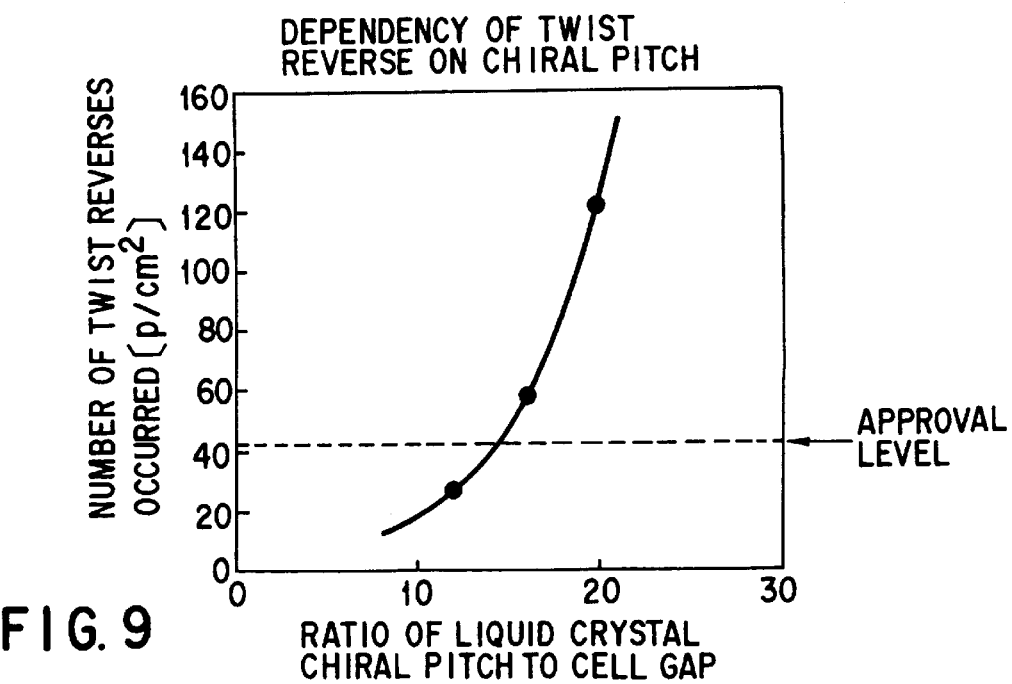
FIG. 9 is a graph showing the relation between the ratio of the chiral pitch of the liquid crystal to the cell gap and the number of twist reverses that occur in the liquid crystal display device according to the invention.

The relation between the chiral pitch and the number of twist reverses occurred will be explained with reference to the following Table 1 and FIG. 9. In the case where the liquid crystal molecule twist in arrangement, the chiral pitch of the liquid crystal is defined as the thickness of the liquid crystal layer per one turn of twist of the crystal molecule arrangement.

Table 1 shows the result of measurement of the twist reverse for various chiral pitches of the liquid crystal of a liquid crystal display device according to the first embodiment, and the relation between the ratio of the liquid crystal chiral pitch to the cell gap and the number of twist reverses occurred. FIG. 9 is a graph of the measurement plotted based on Table 1.

TABLE 1

| Liquid crystal chiral pitch (μm) | Ratio of liquid crystal chiral pitch to cell gap | Number of twist reverses (p/mm$^2$) |
| --- | --- | --- |
| 100 | 20 | 122 |
| 80 | 16 | 58 |
| 60 | 12 | 26 |

The number of twist reverses of a level having no adverse effect on the image quality of the liquid crystal display device is not more than 40 per cm$^2$ which is set as an image quality approval level. As seen from FIG. 9, the twist reverse can be desirably prevented by setting the ratio of liquid crystal chiral pitch to the cell gap to not more than 14. Taking the response speed of the liquid crystal into account, the ratio of liquid crystal chiral pitch to the cell gap is desirably set to not less than 10. Assuming that the thickness of the liquid crystal layer is about 4 to 5 μm, therefore, the desirable chiral pitch of the liquid crystal is 40 μm to 70 μm.

As described above, in a liquid crystal display device comprising a film which is provided on an opposed substrate or an array substrate and includes a plurality of apertures or an island pattern in the areas opposing the pixel electrodes, if the ratio of liquid crystal chiral pitch to the cell gap is set in a range of 10 to 14, the image quality of the liquid crystal display device can be improved.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
    an array substrate including a plurality of wirings arranged in matrix on an insulating substrate, and a plurality of pixel electrodes each of which is arranged in an area defined by the wirings and is connected to the wirings through a switching element;
    an opposed substrate arranged to oppose the array substrate with a gap;
    a liquid crystal layer held in the gap between the array substrate and the opposed substrate;
    a plurality of particulate spacers arranged between the array substrate and the opposed substrate for maintaining the gap between the array and opposed substrates at a predetermined value;
    an orientation film arranged on at least one of the array substrate and the opposed substrate and being in contact with the liquid crystal layer; and
    a film arranged on one of the array substrate and the opposed substrate and having a plurality of areas opposed to the pixel electrodes, respectively, each of the areas including a plurality of apertures for limiting the movement of the spacers.

2. A liquid crystal display device according to claim 1, wherein the array substrate includes an insulating film arranged to cover the wirings, the switching elements and the pixel electrodes, and constituting the film with the apertures.

3. A liquid crystal display device according to claim 1, wherein each of the apertures is polygonal in shape.

4. A liquid crystal display device according to claim 1, wherein the width of the section produced by cutting each of the apertures along an arbitrary straight line is less than 40 µm.

5. A liquid crystal display device according to claim 1, wherein a plurality of apertures formed in one of the areas opposing the pixel electrodes are arranged to define a shape substantially corresponding to the shape of the pixel electrode as a whole.

6. A liquid crystal display device according to claim 1, wherein the film has an unevenness having a height of not less than 1000 Å defined by a plurality of the apertures.

7. A liquid crystal display device according to claim 6, wherein the height of the unevenness is not less than 1500 Å.

8. A liquid crystal display device according to claim 1, wherein the ratio between the chiral pitch and the thickness of the liquid crystal layer is set in a range of 10 to 14.

9. A liquid crystal display device according to claim 8, wherein the chiral pitch of the liquid crystal layer is in a range of 40 to 70 µm.

10. A liquid crystal display device according to claim 9, wherein the chiral pitch of the liquid crystal layer is 60 µm.

11. A liquid crystal display device according to claim 1, wherein the film with the apertures is formed of silicon nitride.

12. A liquid crystal display device according to claim 1, wherein the orientation film is formed over the film with the apertures and processed for orientation in a predetermined direction, and the apertures of the film have a shape extending substantially in parallel to the direction in which the orientation film is processed for orientation.

* * * * *